June 12, 1928.
R. WINTZER
1,673,476
POWER PLANT
Filed Nov. 17, 1921
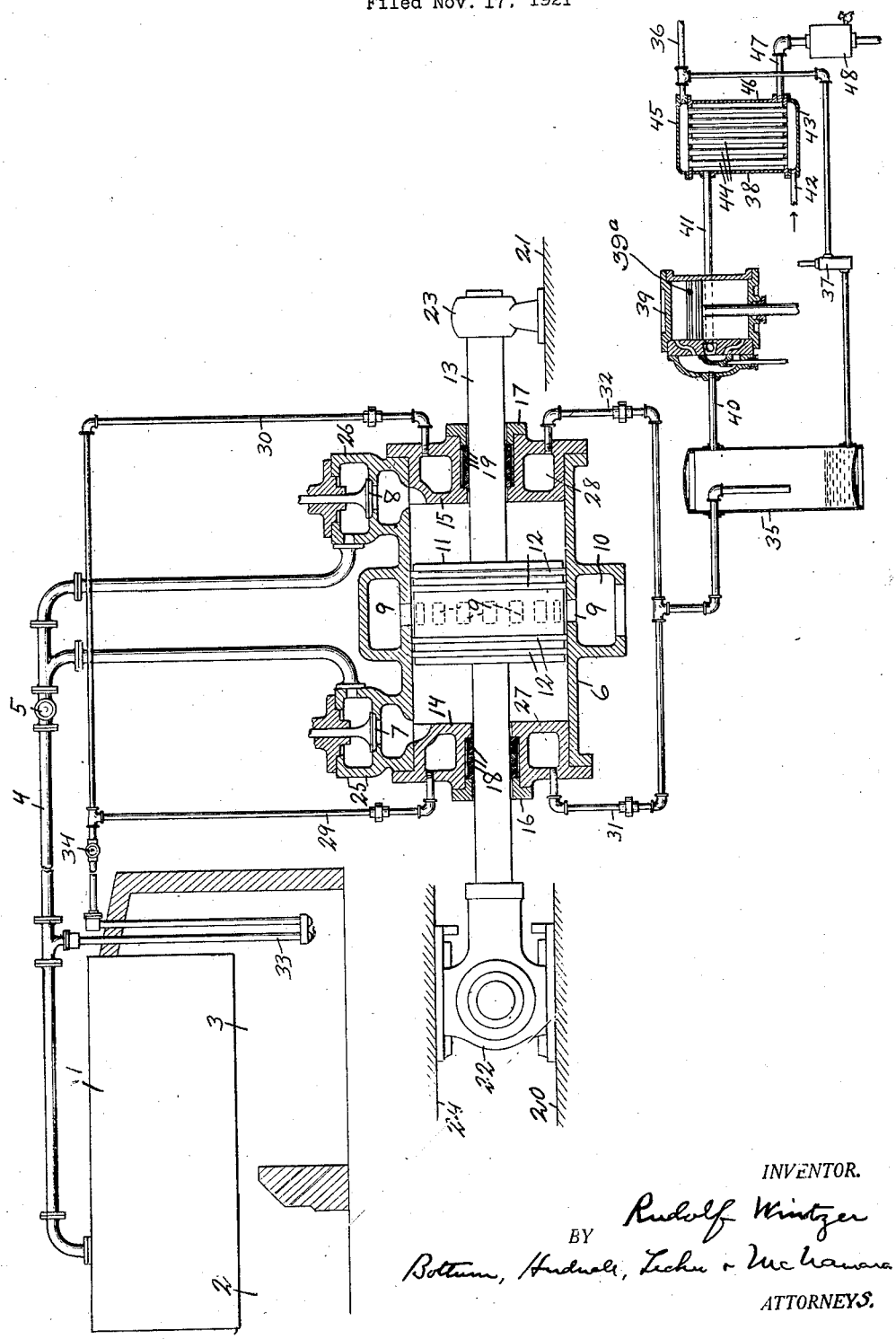
INVENTOR.
BY Rudolf Wintzer
Bottum, Hudwell, Zecher & McNamara
ATTORNEYS.

Patented June 12, 1928.

1,673,476

UNITED STATES PATENT OFFICE.

RUDOLF WINTZER, OF MILWAUKEE, WISCONSIN, ASSIGNOR TO NORDBERG MANUFACTURING COMPANY, OF MILWAUKEE, WISCONSIN, A CORPORATION OF WISCONSIN.

POWER PLANT.

Application filed November 17, 1921. Serial No. 515,826.

This invention relates to power plants and the object of the invention is to improve the construction and operation of power plants in the manner to be hereinafter described and claimed.

Referring to the drawings which accompany this specification and form a part hereof, which drawings illustrate an embodiment of this invention, the figure of the drawings is a vertical, longitudinal section of a power plant, all parts being omitted, for the sake of simplicity of illustration and terseness of description, which are not necessary to a complete understanding of this invention.

Referring to the drawings, the reference numeral 1 designates a steam boiler associated with the combustion chamber 2 and the flue-space 3 of the furnace for heating the same. A steam-pipe 4, provided with a throttle-valve 5, serves to conduct steam to the two ends of a cylinder 6, which is illustrated as of the terminal-exhaust, or uniflow, type. The reference numerals 7 and 8 designate the steam admission valves which are opened and closed in proper sequence by any suitable mechanism, not shown, preferably of a governing type, and the steam exhausts through exhaust-ports 9 into a chamber 10 when the piston 11 uncovers the exhaust-ports 9 during its reciprocations, in the well-known manner. For the greatest efficiency, the chamber 10 communicates with a condenser, not shown.

Speaking generally, there are two essential factors in a power plant which are interrelated, one being the thermal efficiency of the plant and the other being continuity of thermal efficiency, and the object of this invention is to attain the utmost thermal efficiency of a power plant while at the same time attaining the utmost continuity of the thermal efficiency of a power plant.

The piston 11 is a floating piston and does not bear against the cylinder-wall, steam being prevented from passing the piston by one or more piston-rings 12 located near each end of the piston. The piston 11 is supported by a piston-rod 13 which floats through the cylinder-heads 14 and 15 and the followers 6 and 17, steam tight joints being made by any suitable packing-rings 18 and 19, preferably made from metal and of the type which has a spring, or yieldable grip upon the piston-rod. By making the parts in the manner described the friction of inaccessible parts is reduced to a minimum so that excessive friction is obviated and the bearing surfaces can be readily kept lubricated by any suitable lubricating mechanism, not shown. It will be readily seen that the only friction to be overcome in the parts thus far described is the slight friction of the piston-rings on the wall of the cylinder and the slight friction of the packing-rings 18 and 19 on the piston-rod, and that the pressures creating friction are only the spring pressures holding the piston-rings against the wall of the cylinder and the spring pressures holding the packing-rings against the piston-rod. The piston-rod 13 is firmly supported upon slides 20 and 21 in any suitable manner as, for example, by a cross-head 22 and a slidable support, or tail cross-head, 23. An upper slide 24 retains the cross-head 22 in proper position when the engine is reversed. The slides 20, 21 and 24 are always accessible and their proper lubrication can be attended to without stopping the engine. By the term "engine" the prime mover of the power plant is intended, the prime mover being illustrated as the cylinder 6 and associated mechanism.

The steam-chests 25 and 26 are not incorporated with the cylinder-heads but are placed at the ends of the cylinder and the steam-chests and the cylinder may be steam jacketed or lagged with heat insulating material in any suitable manner, not shown. By not incorporating the steam-chests with the cylinder-heads, the cylinder-heads may be made much smaller in thickness and may be removed and replaced without disturbing any main steam-line. The piston-rod 13 must be made large enough in diameter to support the weight of the piston 11 without appreciable or detrimental sag and its diameter is a factor of its length between its supports, viz,—the cross-head 22 and the slidable support or tail cross-head 23. As it is necessary to remove the piston from the cylinder occasionally to replace piston-rings, for example, it is desirable not to have to dismantle the engine more than is absolutely necessary for the purpose and the arrangement is such that the cylinder-heads can be loosened from the cylinder and the piston loosened from the piston-rod and a cylinder-head and the piston slid out on the piston-rod, when at its limit of movement, so that the piston will be clear of the cylinder. One such connection between the piston and piston rod is shown and described in the patent to B. V. Nordberg, granted March 14, 1922, No. 1,409,309. The slides 20, 21 and 24 are placed at opposite sides of the cylinder. With this construction the piston-rod 13 can be made of the shortest possible length with a corresponding reduction of its diameter and a corresponding increase in the area of the faces or ends of the piston subjected to steam pressure.

As it is sometimes desirable to heat the cylinder-heads to increase the efficiency of the engine, and as it is always desirable to heat up the cylinder before starting the engine, the cylinder-heads are provided with chambers 27 and 28 with the upper parts of which heating-fluid pipes 29 and 30 are connected. Drain or exhaust-pipes 31 and 32 communicate with the bottoms of the chambers 27 and 28 so that there will be a positive circulation of the heating-fluid through said chambers 27 and 28 with no chance for pocketing. The heating-fluid may be some fluid other than steam but a most economical system is to pipe steam through a superheater 33 and thence to chambers 27 and 28. The flow of this steam can be controlled by a valve 34. The steam can be superheated to a very high degree and is exhausted, together with any water of condensation, from the chambers 27 and 28 to a separator 35, which serves to separate water from the steam. The water of condensation, which is hot, can be pumped into the boiler feed-pipe 36 by a small pump 37, thereby returning the water to the boiler, as it is pure and not contaminated with oil, and imparting its excess heat to the feed-water which has been preheated in the preheater 38. The steam from the separator 35 can be utilized for any heating or power purpose whatever as may be desirable. The drawings illustrate this steam as led from the separator 35 to the steam-chest of an auxiliary engine 39 which may be the engine for working the pump of the condenser, not shown, and which is illustrated as a slide-valve engine to emphasize the fact that the highly superheated steam has lost so much of its superheat that it can be safely used to operate a type of engine which is not usually adapted to use highly superheated steam. The reference numeral 40 designates the steam-pipe leading from the separator 35 to the steam-chest of the auxiliary engine 39 and the reference numeral 41 designates the exhaust-pipe leading from the auxiliary engine 39 to the casing of the preheater 38. The feed-water for the boiler 1 passes through the pipe 42 to the lower header 43, thence through vertical pipes 44 to the upper header 45 and to the boiler feed-pipe 36, being heated by the exhaust steam from the auxiliary engine 39 within the casing 46 and around the vertical pipes 44. Water of condensation and uncondensed steam can escape from the casing 46 through a pipe 47 to an oil separator 48 and thence to waste or further use.

The operation of the power plant will be obvious from the foregoing description, but a few things should be distinctly understood. Except as hereinafter specifically claimed, the actual constructions illustrated by the drawings are to be regarded as illustrative of types of apparatus merely. The steam for the main engine may be, and preferably is, superheated, but the drawings are intended to emphasize the fact that steam flowing to the main engine is not used to heat the cylinder-heads; that that steam can be very highly superheated, but nevertheless is capable of use to operate an auxiliary engine or other apparatus of a type which could not utilize the steam at the temperature of its initial superheat on account of lubrication trouble, for example. No main steam-pipe has to be disconnected when the cylinder-heads or the piston are removed from the cylinder. Only small pipes have to be disconnected and the time required between starting to take down and running again, for large engines, is reduced from an entire day or longer, to an extremely short time by reason of the constructions illustrated and described.

It will be obvious that the shorter a piston-rod can be for a large engine, the less will be the kinetic energy of the reciprocating parts, and it will be obvious that the tail cross-head 23 can be supported in different ways so that the cylinder-head may be moved away from the cylinder and the piston removed from the cylinder.

What is claimed is:

1. In a power plant, in combination, a main fluid pressure cylinder having a cylinder head formed with a chamber, a main piston operating in the main fluid pressure cylinder, valve controlled fluid pressure supply means for supplying fluid pressure to the main cylinder for actuating the piston therein, means separate from and independent of the valve controlled fluid pressure supply means for supplying heating fluid under pressure to the chamber of the cylinder head, an auxiliary engine including a cylinder, a piston reciprocable in the cylinder and valve controlled means for regulating the supply and the exhaust of fluid into and from the cylinder of the auxiliary engine and means affording free and open communication between the chamber of the cylinder head and the valve controlled means employed for regulating the supply and exhaust of the fluid under pressure to the cylinder of the auxiliary engine.

2. In a power plant, in combination, a main fluid pressure cylinder having its cylinder heads formed with chambers, a main piston operating in said main cylinder, valve cointrolled fluid pressure supply means for supplying fluid pressure to the main cylinder for actuating the piston therein, means separate from and independent of the valve controlled fluid pressure supply means for supplying heating fluid under pressure to the chambers of the cylinder heads, an auxiliary engine including an auxiliary cylinder separate and distinct from the main cylinder, an auxiliary piston reciprocable in the auxiliary cylinder, a valve chest associated with the auxiliary cylinder, a slide valve operating in said chest to regulate the supply and exhaust of fluid under pressure from the valve chest to the opposite sides of the piston in the auxiliary cylinder, a separator having a steam space, pipes affording open communication between the chambers and the steam space of the separator and a pipe affording open communication between the steam space of the separator and the valve chest of the auxiliary engine.

3. The combination with a uni-flow type of steam engine having jacketed cylinder heads, of means connected with said jackets for supplying heating fluid thereto distinct from the working steam of the engine, and a prime mover independent of said engine operated by said fluid whereby, as an incident of such operation, there will be a positive circulation of said heating fluid through said jackets.

4. In combination with a uni-flow steam engine having jacketed cylinder heads, a source of steam common to both said engine and its jackets, a heater interposed between the jackets and said source for supplying super-heated steam to the former, and a prime mover independent of said engine operated by the steam issuing from said jackets.

In witness whereof I hereto affix my signature.

RUDOLF WINTZER.